US012129687B2

(12) United States Patent
Yu

(10) Patent No.: US 12,129,687 B2
(45) Date of Patent: Oct. 29, 2024

(54) FLIPPABLE CABLE LOCK

(71) Applicant: FULLYEAR-BROTHER ENTERPRISE CO., LTD., Changhua County (TW)

(72) Inventor: Chun Te Yu, Changhua County (TW)

(73) Assignee: FULLYEAR-BROTHER ENTERPRISE CO., LTD., Changhua County (TW)

( * ) Notice: Subject to any disclaimer, the term of this patent is extended or adjusted under 35 U.S.C. 154(b) by 0 days.

(21) Appl. No.: 18/507,835

(22) Filed: Nov. 13, 2023

(65) Prior Publication Data

US 2024/0076909 A1 Mar. 7, 2024

Related U.S. Application Data

(63) Continuation of application No. 17/885,015, filed on Aug. 10, 2022, now Pat. No. 11,828,089.

(30) Foreign Application Priority Data

Dec. 30, 2021 (TW) ................................ 110149776

(51) Int. Cl.
*E05B 67/00* (2006.01)
*E05B 37/02* (2006.01)

(52) U.S. Cl.
CPC .......... *E05B 67/003* (2013.01); *E05B 37/025* (2013.01)

(58) Field of Classification Search
CPC ............................. E05B 37/025; E05B 67/003
See application file for complete search history.

(56) References Cited

U.S. PATENT DOCUMENTS

| | | | | |
|---|---|---|---|---|
| 3,879,721 A | | 4/1975 | Yereance | |
| 5,447,043 A | | 9/1995 | Hwang | |
| 6,227,016 B1 | | 5/2001 | Yu | |
| D450,560 S | * | 11/2001 | Yu | E05B 67/003 D8/333 |
| 6,349,575 B1 | | 2/2002 | Bentley | |
| 6,363,758 B1 | | 4/2002 | Ling | |
| 6,843,080 B1 | * | 1/2005 | Yu | E05B 37/025 70/284 |
| 6,997,023 B1 | | 2/2006 | Huang | |

(Continued)

FOREIGN PATENT DOCUMENTS

| | | |
|---|---|---|
| CN | 2528854 Y | 1/2003 |
| CN | 2695566 Y | 4/2005 |

(Continued)

*Primary Examiner* — Christopher J Boswell
(74) *Attorney, Agent, or Firm* — MUNCY GEISSLER OLDS & LOWE P.C.

(57) ABSTRACT

The present invention discloses a flippable cable lock with a twistable cable capable of being twisted into an X-shape cross state and remains in that state. In addition, the cable lock further includes a combination lock mechanism, an elastic member and a key lock mechanism. The elastic member includes a plurality of arc-shape elastic sheets engaging with multiple dials of the combination lock mechanism. The key lock mechanism includes a blocking portion and a push portion. When the key lock mechanism is unlocked, the blocking portion leaves from blocking a lower-section of the twistable cable, and the push portion pushes the lower-section to move.

4 Claims, 7 Drawing Sheets

(56) References Cited

U.S. PATENT DOCUMENTS

| | | | | |
|---|---|---|---|---|
| 7,047,772 | B2 * | 5/2006 | Yu | E05B 37/025 70/284 |
| 7,251,965 | B2 | 8/2007 | Yu | |
| 7,571,627 | B2 | 8/2009 | Yu | |
| 10,267,066 | B2 | 4/2019 | Fan | |
| 11,828,089 | B2 * | 11/2023 | Yu | E05B 37/025 |
| 2008/0011027 | A1 | 1/2008 | Yu | |
| 2008/0066500 | A1 | 3/2008 | Su | |
| 2011/0041570 | A1 * | 2/2011 | Huang | E05B 37/0034 70/21 |
| 2016/0312497 | A1 | 10/2016 | McGinnis et al. | |

FOREIGN PATENT DOCUMENTS

| | | | |
|---|---|---|---|
| CN | 204163497 | U | 2/2015 |
| TW | M282013 | | 12/2005 |

* cited by examiner

FLIPPABLE CABLE LOCK

CROSS REFERENCE TO RELATED APPLICATIONS

This application is a Continuation Application of co-pending application Ser. No. 17/885,015, filed on Aug. 10, 2022, for which priority is claimed under 35 U.S.C. § 120; and this application claims priority of Application No. 110149776 filed in Taiwan on Dec. 30, 2021 under 35 U.S.C. § 119, the entire contents of all of which are hereby incorporated by reference.

BACKGROUND OF INVENTION

Field of Invention

The present invention relates to a luggage lock, more particularly, to a cable lock with a flippable cable.

Related Prior Art

A conventional cable lock comprising a housing, a cable and a lock mechanism. The housing has two holes. Each of the two terminal ends of the cable has a connecting portion, wherein one of the connecting portions is located inside a connecting hole of the housing, and cannot be pulled out of the connecting hole, and the other connecting portion can be plugged in and out of a receptacle located inside the housing. The lock mechanism is configured to lock or release the connecting portion that is inserted inside the receptacle. The most distinctive feature of the cable lock is the twistable cable used to lock an object.

In recent years, a lock with dual-lock mechanisms was introduced to meet the customs inspections requirements, a lock of such can be found in U.S. Pat. No. 7,251,965. The two connecting portions of the cable can be respectively plugged in and out of the two long receptacles of the housing, wherein a lock mechanism allows the customs officer to lock or unlock the lock, and the other lock mechanism allows a user to lock or unlock the lock. This is the main distinctive feature of the present dual-lock cable lock from the conventional cable lock.

FIG. 16 shows a conventional cable lock 9 being used on a luggage and is in a locked state, at this time, a connecting portion 911 of the cable 91 and its housing 92 remains connected, while the other connecting portion 912 of the cable 91 passes through the through holes 811 of the two zipper pull tabs of the luggage, and remains in a receptacle 921 of the housing 92. The problem is that during the transportation of the luggage 8, the housing 92 of the cable lock 9 may often be tossed around, which cause the cable 91 to twist the two zipper pull tabs 81. Although the existing cable 91 may be flexible, but it still has considerable amount of rigidity, so it is still possible to snap the two zipper pull tabs 81 after repeated twisting. Moreover, if someone intentionally turns over the housing 92 continuously in the same direction, the cable 91 that turns and twist along the housing 92 will snap the two zipper pull tabs 81.

Therefore, the industry eager anticipates a new type of cable lock that could reduced the aforementioned issue related to the cable snapping the zipper pull tabs.

SUMMARY OF THE INVENTION

The present invention provides a flippable cable lock including a housing with a first shell. The first shell has two holes. Each of the holes includes a first hole portion with a first width and a second hole portion with a second width. The first hole portion is laterally connected to the second hole portion. The first width is less than the second width. Two accommodating cavities are respectively provided below the holes in the housing. A cable has a twistable cable cord with two connecting portions respectively disposed at two terminal ends of the cable cord. Each connecting portion has an upper-section connected to the terminal end of the cable cord, a lower-section and a mid-section between the upper-section and the lower-section. The lower-section is able to pass through the second hole portion so as to enter and exit the accommodating cavity but unable to pass through the first hole portion. The mid-section is able to pass through the second hole portion and move back and forth within the first and second hole portion. After both the lower-sections of the cable cord pass through the corresponding second hole portion and then move to an underside of the corresponding first hole portion, the cable cord is bent into an U shape and is further able to be twisted into an X-shaped cross state and remains continuously. The two upper-sections of the cable cord in the X-shape cross state respectively lean into the two second hole portions from a top of the two first hole portions, and inclined at different directions.

In one embodiment, the housing further includes a second shell and a third shell. The second shell extends downward from the first shell. The second shell is integrally formed with the first shell. The third shell is engaged with the second shell and the first shell.

In one embodiment, the first shell further includes two upper walls that protrude upwards and are opposite to each other. The two connecting portions of the cable bent into the U shape is inclined at an angle, so that the upper-section of each of the connecting portions respectively leans against the two upper walls.

In a more detailed embodiment, each of the two upper-sections covers an entire of the corresponding second hole portion and leans against an edge of the corresponding second hole portion.

In a more detailed embodiment, one of the upper-sections covers the entire of the corresponding second hole portion while the other upper-section covers a part of the corresponding second hole portion.

In one embodiment, when the cable cord is in the X-shaped cross state, a cross point of the cable cord is farther away from an apex of the cable cord, and closer to the two connecting portions.

In a more detailed embodiment, the two second hole portions are of the same size. One of the two first hole portions is longer in length than the other. When the cable cord in the X-shape cross state, the cross point of the cable cord is closer to the first hole portion with the smaller length, and farther away from the first hole portion with the longer length.

In one embodiment, the flippable cable lock further includes a combination lock mechanism for locking and unlocking one of the connecting portions of the cable, and an elastic member disposed in the housing. The combination lock mechanism includes a plurality of dials exposed from the housing. Each dial has a plurality of blocks and a plurality of grooves. Each block has an identification element. Each groove is located between two adjacent said blocks. The elastic member includes a base sheet and a plurality of elastic sheets respectively connected to a side of the base sheet. The elastic sheets abut against the dials one by one. Each of two ends of each elastic sheet is provided with a protruding portion capable of lodging into one said groove of the corresponding dial.

DETAILED DESCRIPTION

Figure 1:
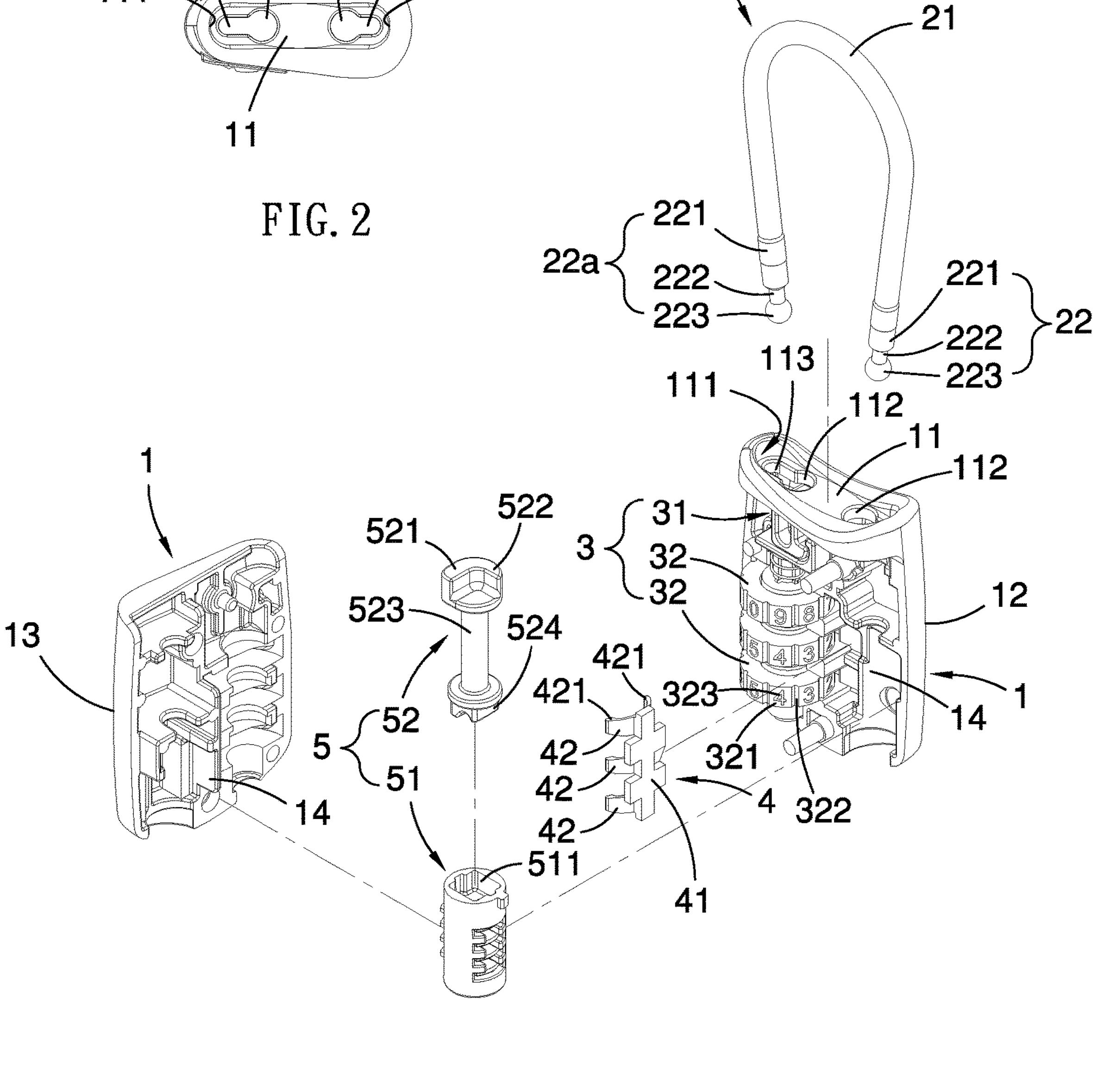
FIG. 1 is an exploded view of the flippable cable lock in accordance with a preferred embodiment of the present invention.

FIG. 1 is a preferred embodiment of the cable lock of the present invention. The cable lock includes a housing 1 and a cable 2.

Figure 3:
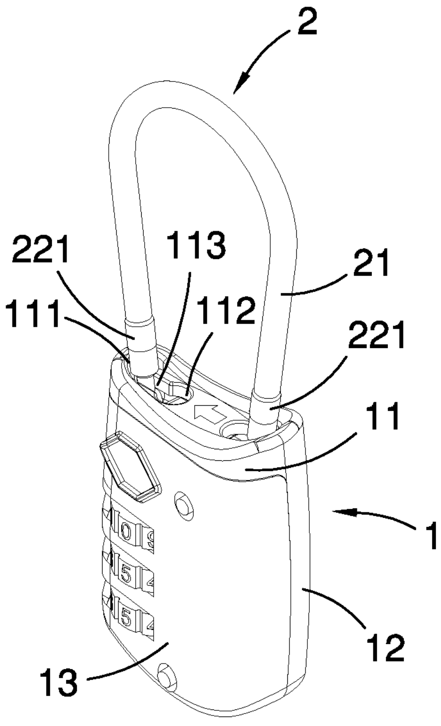
FIG. 3 is a perspective view of the preferred embodiment of the present invention.

In this embodiment, the housing 1 includes a first shell 11. The first shell 11 has two holes. Each of the holes includes a first hole portion 113 with a first width and a second hole portion 112 with a second width. The first width is less than the second width. The first hole portion 113 is in communication with the second hole portion 112, and they are aligned along the length of the first shell 11. In this preferred embodiment, the two second hole portions 112 are located between the two first hole portions 113, but the two first hole portions 113 could also be switched to be located between the two second hole portions 112. In this preferred embodiment, the housing 1 further includes a second shell 12 and a third shell 13. The second shell 12 is extended downward from the first shell 11, and the second shell 12 is integrally formed with the first shell 11, that is, that they are one piece. As shown in FIG. 3, the third shell 13 engages with the second shell 12 and the first shell 11, so that these three shells 11, 12 and 13 together define an inner space, for accommodating a part of or all of the components described herein. Two accommodating cavities 15 are respectively provided below the holes in the housing 1.

The cable 2 includes a twistable cable cord 21 and two connecting portions 22. The twistable cable cord 21 is preferably made of a steel cable, and the outside of the steel cable is usually covered with a layer of wear-resistant plastic. Each connecting portion 22 includes an upper-section 221, a lower-section 223, and a mid-section 222 located between the upper-section 221 and the lower-section 223. The mid-section 222 is cylindrical and has a diameter less than both the first and second widths of the first and second hole portions 112, 113. The lower-section 223 is spherical and has a diameter between the first and second widths of the first and second hole portions 112, 113. The two upper-sections 221 are respectively connected to two terminal ends of the twistable cable cord 21. Each lower-section 223 is only able to pass through the second hole portion 112 so as to enter and exit the accommodating cavity, but unable to pass through the first hole portion 113. Each mid-section 222 is able to pass through the second hole portion 112, and is able to move from the second hole portion 112 into the first hole portion 113, and to move from the first hole portion 113 into the second hole portion 112. Wherein, when the two lower-sections 223 of the cable 2 respectively enter into the two accommodating cavities 15 and move into the underside of the two first hole portions 113, the second shell 12 and the connecting portions 22 of the cable 2 are thus connected, as shown in FIGS. 3 and 4, and at this point, the twistable cable cord 21 of the cable 2 is twisted to form a U-shape.

Figure 4:
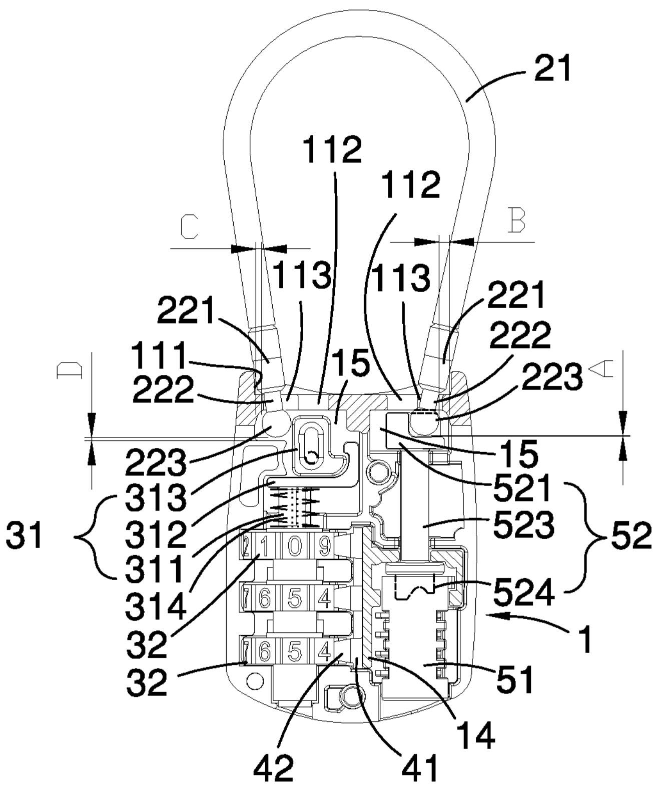
FIG. 4 shows the preferred embodiment of the present invention with the housing 1 being ripped.

As shown in FIGS. 3 and 4, the first shell 11 further comprises two upper walls 111 that protrude upwards and are opposite to each other. Through the elastic force accumulated when the twistable cable cord 21 is bent, the two connecting portions 22 of the cable 2 in U-shape is inclined at an angle, so that the upper-section 221 of each of the connecting portion 22 respectively leans against the two upper walls 111 of the first shell 11.

Figure 5:
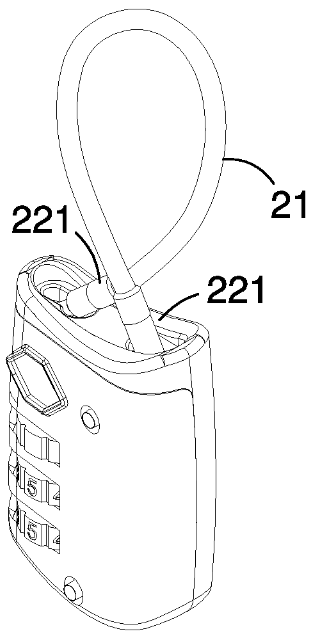
FIG. 5 is a perspective view of a twistable cable 21 being twisted to form an X-shaped cross state in accordance with the preferred embodiment of the present invention.
Figure 6:
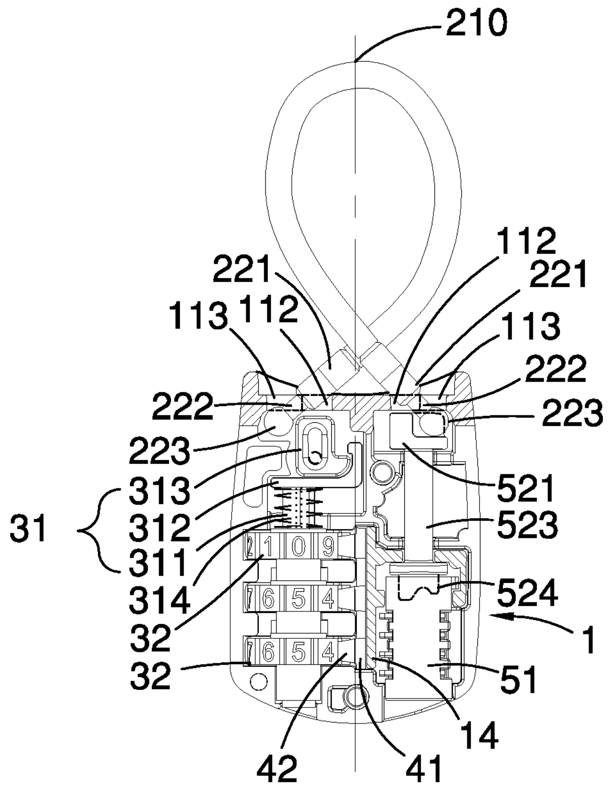
FIG. 6 is a cross-sectional view of the preferred embodiment of the present invention in FIG. 5 with the housing 1 being ripped.

Furthermore, the twistable cable cord 21 of the cable 2 in U-shape can be twisted into an X-shape cross state, and remain in that X-shape cross state, as shown in FIGS. 5 and 6. At this time, by twisting the twistable cable cord 21 reversely, the cable 2 can be restored to U-Shape.

As shown in FIGS. 5 and 6, when the twistable cable cord 21 is in an X-shape cross state, the two upper-sections 221 respectively lean into the two second hole portions 112 from top of the two first hole portions 113, and inclined at different directions. Wherein, the two upper-sections 221 respectively cover the entire two second hole portions 112, and each leans against the edge of the two second hole portions 112. However, the two upper-sections 221 can also covers part of the two second hole portions 112. In addition, one of the upper-section 221 may cover the entire corresponding second hole portion 112, while the other upper-section 221 covers part of the corresponding second hole portion 112.

When the twistable cable cord 21 is in X-shape state, a cross point of the twistable cable cord 21 is farther away from an apex 210 of the twistable cable cord 21, and closer to the two connecting portions 22.

Figure 2:
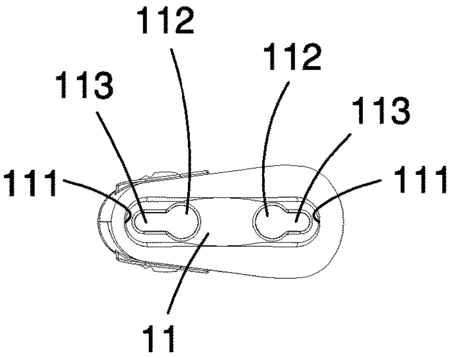
FIG. 2 is a top view of a lock housing 1 in accordance with the preferred embodiment of the present invention.

As shown in FIG. 2, the two second hole portions 112 are of the same size, whereas one of the two first hole portions 113 is longer in length than the other. When the twistable cable cord 21 in X-shape state, the cross point of the twistable cable cord 21 is closer to the first hole portion 113 with the smaller length, and farther away from the first hole portion 113 with the longer length. In this embodiment, the length of the first hole portion 113 on the left is greater than the length of the first hole portion 113 on the right, hence, the cross point of the twistable cable cord 21 is closer to the first hole portion 113 on the right, and farther away from the first hole portion 113 on the left.

In any case, the aforementioned twistable cable cord 21 can be twisted into X-shape, indicating that the twistability of the entire cable 2 is high, allowing it to be flipped and twisted along with the housing 1. In other words, it is in high compliance with twisting of the housing 1. Even though the housing 1 is twisted in a case that the twistable cable cord 21 locks on the zipper pull tabs 81, the likelihood of the zipper pull tabs 81 being broken by the twistable cable cord 21 is reduced since the twistable cable cord 21 applies less force on the zipper pull tabs 81. Even if someone deliberately flips the housing 1 in the same direction with force, the zipper pull tabs 81 are not easily damaged.

As shown in FIG. 1, the cable lock of the present invention further includes a lock mechanism, for locking the two connecting portions 22 disposed inside the housing 1, as shown in FIGS. 3 and 4. In the preferred embodiment, the lock mechanism includes a combination lock mechanism 3 and a key lock mechanism 5, but not limited thereto, for example, the lock mechanism may only have a combination lock mechanism, or one key lock mechanism, or two combination lock mechanisms or two key lock mechanisms. In a preferred embodiment, the combination lock mechanism 3 can be locked or unlocked by a user (such as the owner of the cable lock) to determine whether one of the connecting portions 22 can be pulled away from the housing 1. The key lock mechanism 5 can be locked or unlocked by another user (such as a customs luggage inspector) to determine whether the other one of the connecting portions 22 can be pulled away from the housing 1.

As shown in FIGS. 1 and 4, the combination lock mechanism 3 is located within the housing 1, to lock or unlocked a connecting portion 22 of the cable 2. In a preferred embodiment, the combination lock mechanism 3 includes a plurality of dials 32 exposed from the housing, and each dial 32 has a plurality of blocks 321 and a plurality of the grooves 322, each block 321 has an identification element 323 respectively, and each groove 322 is located between the two adjacent blocks 321. Each identification element 323 is preferably a number, a letter or a symbol.

Figure 7:
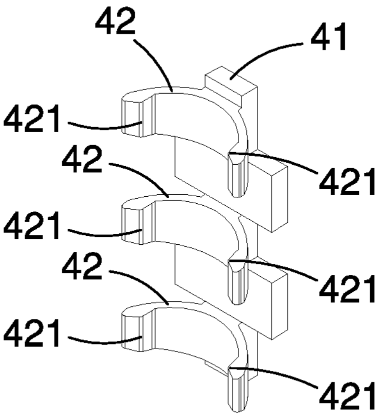
FIG. 7 is a perspective view of an elastic sheet in accordance with the preferred embodiment of the present invention.

In the preferred embodiment, the combination lock mechanism 3 further comprises an elastic member 4 located within the housing 1, it is located beside the combination lock mechanism 3 and includes a base sheet 41, and a plurality of elastic sheets 42. The base sheet 41 and the elastic sheets 42 are integrally formed, that is, they are of one piece, and they are preferably made of plastic material with high elasticity and high wear resistance (durability), wherein, a back side of the base sheet 41 is leaning against a wall 14 of the housing 1, and each elastic sheet 42 protrudes forward from the base sheet 41 and forms an arc shape, and each of the two ends of the elastic sheet 42 has a protruding portion 421 respectively. As shown in FIG. 7, each protruding portion 421 can be lodged into the groove 322 of the dial 32, to provide a resistance to the dial 32, to keep it tight, meaning, the dial could be turned but not randomly rotated, moreover, user can obtain a positioning sense for a better experience when turning the dials.

The combination lock mechanism 3 further comprises a lock assembly 31 located within the housing 1, a correct combination or an incorrect combination can be dialed by the dials 32, to determine whether the lock assembly 31 will enter into a movable state or a non-moving state. That is to say, FIGS. 3 to 6 show the combination lock mechanism 3 in a locked state, at this time, the dial 32 shows an incorrect combination so that the lock assembly 31 is in a non-moving state, thus, the lower-section 223 is blocked by a blocking member 313 and unable to move towards the second hole portion 112 on the right as shown in the figure, so that the lower-section 223 is still restricted by the housing in the underside of the first hole portion 113 on the right as shown in the figure, unable to be pulled away from the housing 1. Even though the lower-sections 223 are restricted, the lower-sections 223 are not firmly fixed in the corresponding accommodating cavities 15 since gaps A, B, C, D are provided as shown in FIG. 4. Wherein, the blocking member 313 is usually located at a blocking position at the underside of the second hole portion 112 on the right as shown in the figure, and it could be pushed to the right or downward to leave away from the blocking position.

Figure 8:
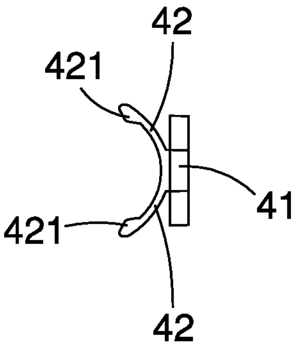
FIG. 8 is a side view of the elastic sheet 42 in accordance with the preferred embodiment of the present invention.
Figure 9:
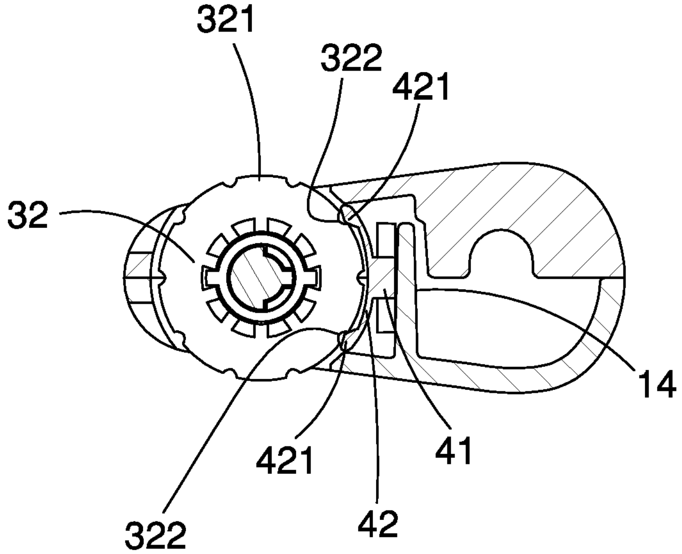
FIG. 9 is a top view of the elastic sheet 42 operating with a dial 32 in accordance with the preferred embodiment of the present invention.
Figure 10:
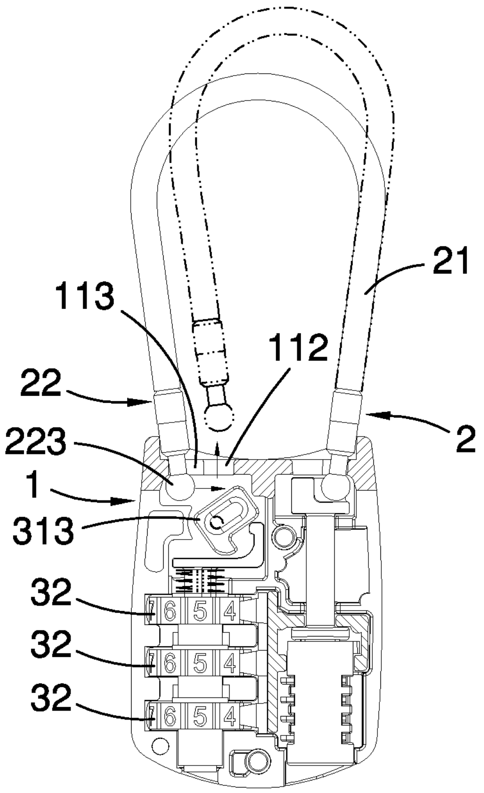
FIGS. 10 to 12 show schematic views of the operation of locking and unlocking of the lock with a plurality of dials 32 in accordance with the preferred embodiment of the present invention.

FIGS. 8 to 10 show the combination lock mechanism 3 in an unlocked state, the dial 32 shows a correct combination so that the lock assembly 31 is in a movable state, thus, the lower-section 223 of one of the connecting portions 22 of the cable 2 is able to move towards the second hole portion 112. Once the lower-section 223 moves toward the second hole portion 112, it will push the blocking member 313 to move away from the underside of the second hole portion 112, as shown in FIG. 8, at this time, the lower-section 223 is able to move from the underside of the first hole portion 113 to the underside of the second hole portion 112, and to pull away from the housing 1 from the second hole portion 112. When the blocking member 313 is moving in a way as aforementioned, it will also push a supporting member 312 of the lock assembly 31 downward, so that a shaft 311 connected to the bottom of the supporting member 312 will also move downward, and thus compressed a spring 314. Once the lower-section 223 is pulled away from the housing 1, the compressed spring 314 will spring upward to push the supporting member 312, which cause the entire lock assembly 31 to return to its original position immediately, as shown in FIG. 9.

FIG. 10 shows the lower-section 223 being inserted into the second hole portion 112 and pressed down the blocking member 313 to move downward, and moves into the underside of the first hole portion 113 from the underside of the second hole portion 112 through the elasticity of the cable 21 itself, then the entire lock assembly 31 will return to its original position immediately through the compressed spring 314, and then, when the dial 32 is dialed with incorrect combination, the entire cable lock will be in a locked state as shown in FIG. 6, so that the lower-section 223 cannot pull away from the housing 1.

Figure 14:
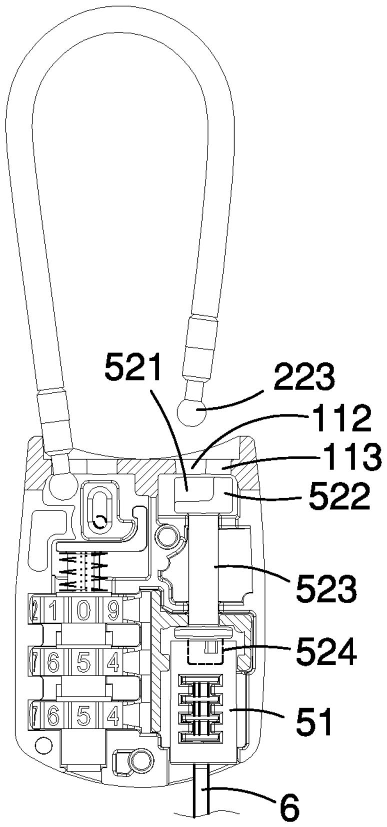
Figure 16:
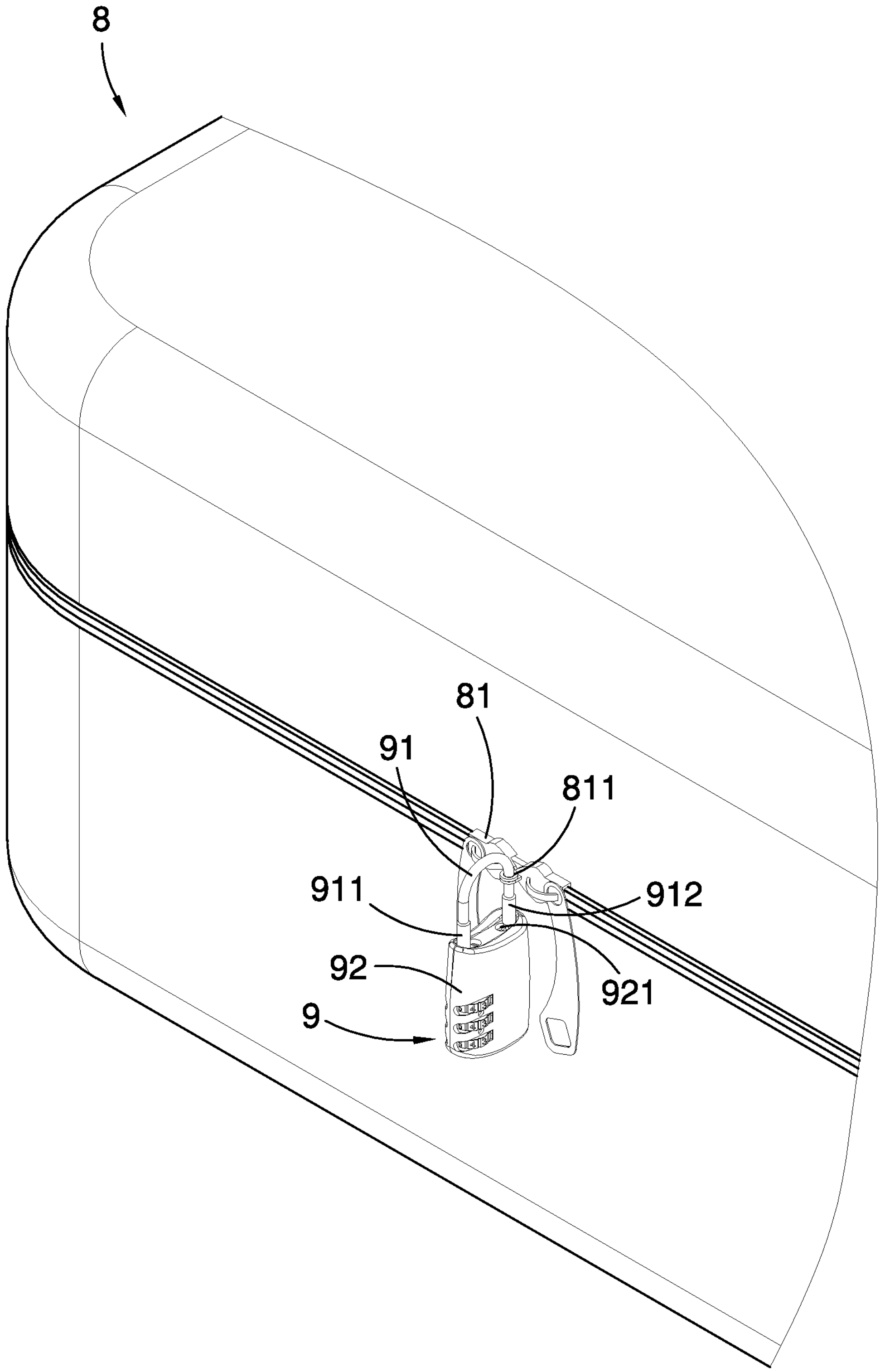
FIG. 16 shows a conventional cable lock when in use.

As shown in FIGS. 1 and 4, the key lock mechanism 5 is located within the housing 1, and is used to lock or unlock the other connecting portion 22 of the cable 2. In a preferred embodiment, the key lock mechanism 5 includes a key lock core 51 and a driving member 52 all located within the housing 1, a bottom portion of the key lock core 51 is exposed from the housing 1 and has a key hole (not shown), as shown in FIG. 14, when a legitimate key 6 is inserted into the key hole, it is able to rotate the key lock core 51. The driving member 52 includes a blocking portion 521, a push portion 522, an extension rod 523 and a coupling portion 524, they are preferably made in one piece. The blocking portion 521 and the push portion 522 are disposed at an end of the extension rod 523, and further the blocking portion 521 is connected with the push portion 522 at an angle about 90 degrees. The blocking portion 521 and the push portion 522 respectively located at two sides of the lower-section 223. Wherein, the coupling portion 524 is coupled to the key lock core 51, so that when the key lock core 51 is rotated it will drive the coupling portion 524 to rotate as well, and the extension rod 523 that is connected to the coupling portion 524 will also rotate, and thus drive the blocking portion 521 and the push portion 522 that are connected to the extension rod 523 to rotate as well. In addition, a top of the key lock core 51 is preferably formed with a coupling hole 511 with multiple sides, such as quadrilateral coupling holes 511. The coupling portion 524 is shaped corresponding to the coupling hole 511, so that it can be coupled to the coupling hole 511.

Figure 11:
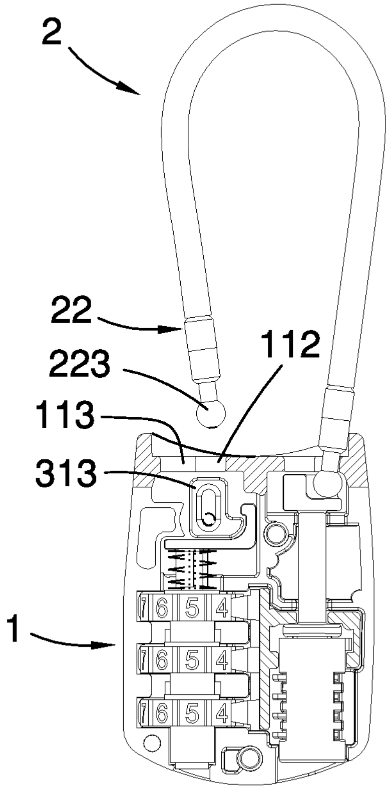

FIGS. 4 to 6 show a key lock mechanism 5 in a locked state, where the blocking portion 521 of the key lock mechanism 5 blocks the lower-section 223 of the connecting portion 22 of the cable, so that the lower-section 223 cannot move towards the second hole portion 112, thus, the lower-section 223 is still retained by the housing 1 in the underside of the corresponding first hole portion 113, and unable to pull away from the housing 1. At this time, as shown in FIG. 11, the push portion 522 is located beside the blocking portion 521 and not blocking the lower-section 223.

Figure 13:
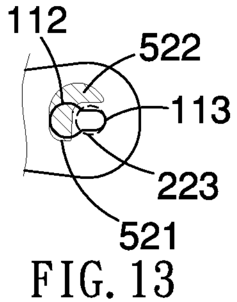
FIGS. 13 to 15 show schematic views of the operation of locking and unlocking of the lock with a key 6 in accordance with the preferred embodiment of the present invention.
Figure 15:
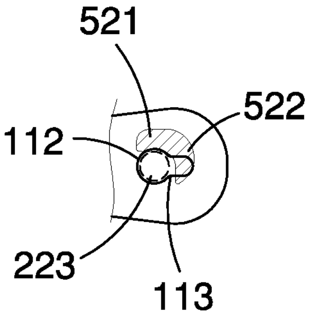
Figure 12:
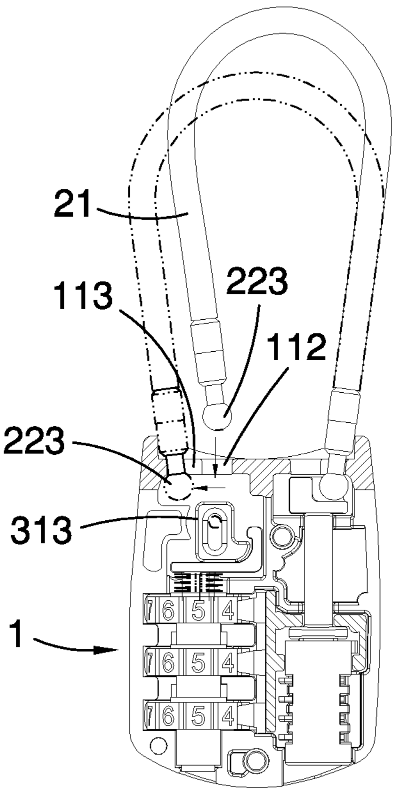

When the key lock core 51 is turned to a locked position by a legitimate key 6 as shown in FIG. 4 to a unlocked position as shown in FIG. 14, as the coupling portion 524 and the extension rod 523 are rotated simultaneously, the blocking portion 521 will move from a blocking position as shown in FIG. 13 to an unblocking position as shown in FIG. 15, and in the process push the lower-section 223 away from the underside of the first hole portion 113 towards the second hole portion 112, and then it can be pulled away from the housing 1 from the second hole portion 112, and at this point, the key lock core 51 is in an unlock state, and no longer locks the lower-section 223.

When the lower-section 223 is inserted into the second hole portion 112, and moves into the underside of the first hole portion 113 from the underside of the second hole portion 112 through the elasticity of the cable 21 itself. By reversing the key 6 to drive the key lock core 51 from an unlocked position to a locked position, the entire driving member 52 is driven to return to its original position, at this time, the entire cable lock will be in a locked state as shown in FIG. 6, so that the lower-section 223 cannot be pulled away from the housing 1.

What is claimed is:

1. A lock comprising:

a housing having at least one hole therethrough, the at least one hole including a first hole portion with a first width and a second hole portion with a second width, the first hole portion being laterally connected to the second hole portion, the first width being less than the second width, wherein an accommodating cavity is provided below the at least one hole of the housing, wherein the housing has a first inner surface adjacent to the first hole portion;

a cable having a cable cord with at least one connecting portion disposed at a terminal end of the cable cord, the at least one connecting portion having an upper-section connected to the terminal end of the cable cord, a lower-section and a mid-section between the upper-section and the lower-section, the lower-section being able to pass through the second hole portion so as to enter and exit the accommodating cavity of the housing but unable to pass through the first hole portion, the mid-section being able to pass through the second hole portion and moving back and forth within the first and second hole portion;

wherein the accommodating cavity has a first position below the first hole portion;

wherein when the lower-section of the at least one connecting portion of the cable is located the first position, there is a first gap between the lower-section and the first inner surface of the housing, and the upper-section of the at least one connecting portion being able to swing from above the first hole portion to second hole portion;

wherein when the upper-section of the at least one connecting portion swings from above the first hole portion towards the second hole portion to a its fullest extent, a portion of the upper-section leans into the second hole portion;

wherein when the upper-section of the at least one connecting portion swings from above the first hole portion towards the second hole portion to its fullest extent, a portion of the mid-section of the at least one connecting portion leans into the second hole.

2. A lock comprising:

a housing having at least one hole therethrough, the at least one hole including a first hole portion with a first width and a second hole portion with a second width, the first hole portion being laterally connected to the second hole portion, the first width being less than the second width, wherein an accommodating cavity is provided below the at least one of the housing, wherein the housing has a first inner surface adjacent to the first hole portion;

a cable having a cable cord with at least one connecting portion disposed at one terminal end of the cable cord, and the other terminal end of the cable cord connected to the housing, wherein the at least one connecting portion has an upper-section connected to the terminal end of the cable cord, a lower-section and a mid-section between the upper-section and the lower-section, the lower-section being able to pass through the second hole portion so as to enter and exit the accommodating cavity of the housing but unable to pass through the first hole portion, the mid-section being able to pass through the second hole portion and moving back and forth within the first and second hole portion;

wherein the accommodating cavity has a first position below the first hole portion;

wherein when the lower-section of the at least one connecting portion of the cable is located the first position, there is a first gap between the lower-section and the first inner surface of the housing, the upper-section of the at least one connecting portion is above the first hole portion, and the cable cord is bent into a U-shape;

wherein when the bent U-shaped cable cord is twisted at an angle, the upper-section of the at least one connecting portion swings from above the first hole portion to a second position above the second hole portion, and remains in the second position;

wherein when the upper-section of the at least one connecting portion remains in the second position, a portion of the upper-section leans into the second hole portion.

3. The lock as recited in claim 2, wherein when the upper-section of the at least one connecting portion remains in the second position, a portion of the mid-section of the at least one connecting portion leans into the second hole.

4. The lock as recited in claim 2, wherein when the upper-section of the at least one connecting portion remains in the second position, a portion of the upper-section leans into the second hole portion, and a portion of the mid-section of the at least one connecting portion leans into the second hole.

* * * * *